Dec. 15, 1964 A. C. LEENHOUTS ETAL 3,161,835

OSCILLATOR CIRCUIT FOR DETECTING IRREGULARITIES IN YARNS

Filed Oct. 9, 1961 2 Sheets-Sheet 1

INVENTOR
ALBERT C. LEENHOUTS
JACOB VAN WILGEN
ALBERT C. LAMPE
JAN NIJMEYER
BY [signature]
AGENT INVENTOR
ALBERT C. LEENHOUTS
JACOB VAN WILGEN
ALBERT C. LAMPE
JAN NIJMEYER
BY Frank R. [signature]
AGENT United States Patent Office 3,161,835

Patented Dec. 15, 1964

3,161,835
OSCILLATOR CIRCUIT FOR DETECTING IRREGULARITIES IN YARNS

Albert Charles Leenhouts, Wakefield, Mass., and Jacob van Wilgen, Albert Cornelis Lampe, and Jan Nijmeyer, Emmasingel, Eindhoven, Netherlands, assignors to North American Philips Company, Inc., New York, N.Y., a corporation of Delaware Filed Oct. 9, 1961, Ser. No. 143,935
8 Claims. (Cl. 331—65)

The invention relates to a device for detecting irregularities in yarns, comprising a measuring capacitor included in the feedback circuit of an oscillator, the yarn being guided between the plates of this capacitor, the capacity variations of which produced by the irregularities of the yarn affecting the oscillating condition of the oscillator.

Such a device, which is termed in textile technique a "slub catcher" or yarn cleaner is described in Dutch patent specification 88,407. Use is made in this case of a valve oscillator operating at a high frequency (60 mc./s.). The amplitude variations obtained after detection are utilized, when a given adjustable threshold value is exceeded, for actuating a cutting mechanism via a relay circuit arrangement, which mechanism cuts the yarn, so that the slub can be removed. This known slub catcher has a few disadvantages, of which the most important may be the critical adjustment and the instability.

The invention has for its object to provide an improved, transistorized slub catcher, which is stable, reliable and simple and has, moreover, a high sensitivity. In accordance with the invention the oscillator comprises a number of transistor amplifying stages and a non-linear element. The non-linear element consists of two series-connected diodes which are connected via a series resistor to a source of substantially constant direct voltage. The diodes are connected so that they are reverse biased by the direct voltage source. The alternating voltage produced by the oscillator is supplied to the junction of these diodes, the arrangement being such that the amplification is affected by the amplitude-dependent damping produced by the diodes.

The junction of the anode and the cathode of each of the diodes is preferably connected via a capacitor to the collector of a transistor, forming the last amplifying stage and connected in the common emitter configuration, while the anode of the first diode is connected to the supply voltage of the amplifier and the cathode of the second diode is connected to the tapping of a potentiometer, connected between the supply voltage and earth, this tapping being connected to the supply voltage via a capacitor.

It is advantageous in this case to build up the oscillator from three cascade-connected transistors, the first of which is driven as an emitter follower, the second and the third being driven in the common emitter connection. Provision is made of a capacitive negative feedback between the collector of the second transistor and the base of the first transistor and the measuring capacitor is connected between the collector of the third transistor and the base of the first transistor.

Figure 1:
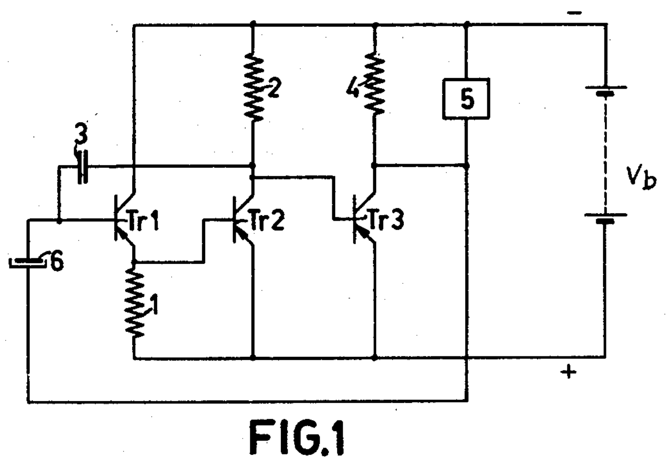
Figure 3:
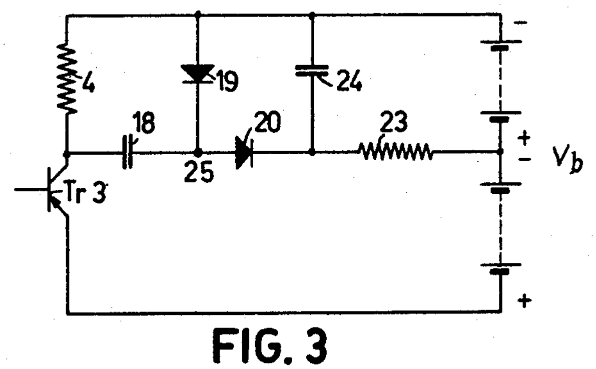

In order that the invention may be clearly understood and readily carried into effect, it will now be described more fully with reference to the accompanying drawing, in which an embodiment of the invention is shown. FIG. 1 shows a block diagram and FIGS. 2 and 3 show detailed circuit diagrams of the slub catchers.

FIG. 1 shows that the arrangement comprises three transistors $Tr_1$, $Tr_2$ and $Tr_3$, which are driven as an emitter follower and in grounded emitter-connection respectively. The transistor $Tr_1$ is driven as an emitter follower in order to obtain a high input impedance; the negative feedback introduced by the capacitor 3 from the collector of the transistor $Tr_2$ to the base of the transistor $Tr_1$ provides in known manner a given degree of stability and independence of the transistor properties. The collector circuit of the transistor $Tr_3$ includes a non-linear element 5, the impedance of which, which also determines the amplification of the transistor $Tr_3$, depends upon the alternating voltage applied.

Provision is furthermore made of a feedback from the collector of the transistor $Tr_3$ via the measuring capacitor 6 to the base of the transistor $Tr_1$. With a correct proportioning the assembly will oscillate with a given frequency, for example 100 kc./s., so that the condition of oscillation, i.e. the loop amplification=1, is fulfilled. With a variation in the capacitance of the measuring capacitor, produced for example, by a slub in the passing yarn, the loop amplification varies and hence the amplitude of the produced voltage. The non-linear element 5 responds thereto and its impedance adjusts itself so that the equilibrium is restored.

Figure 2:
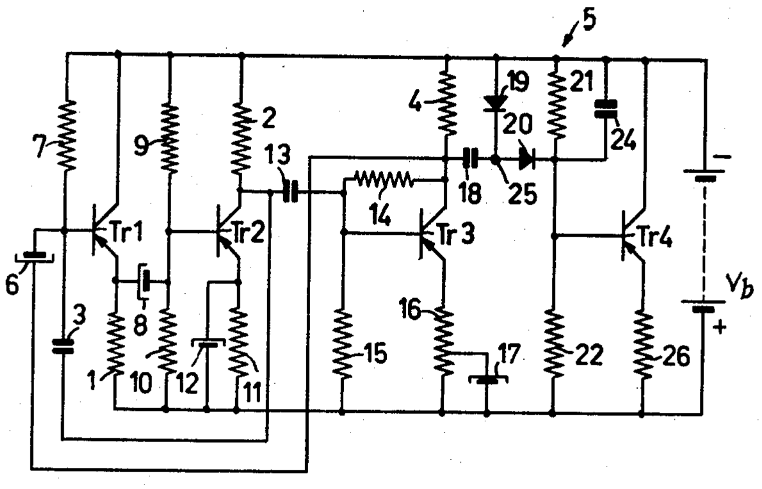

FIG. 2 shows a further detailed diagram of the device. This figure shows the transistor $Tr_1$, driven as an emitter follower, with its emitter resistor 1 and base resistor 7, the emitter being coupled via a capacitor 8 with the transistor $Tr_2$, driven in emitter-base connection, the working point of which is determined by the resistors 9, 10, 2 and 11. The emitter resistor 11 is decoupled by the capacitor 12; the amplified input voltage is derived from the collector resistor 2 and fed via a capacitor 13 to the base of the transistor $Tr_3$.

A negative feedback branch, formed by the capacitor 3 reduces, as is known the amplification, it is true, but it renders the amplifier highly independent of the transistor properties.

The working point of the transistor $Tr_3$ is determined by the resistors 4, 14, 15 and 16. The amplification is mainly determined by the relation: $Zc/Ze$. The emitter impedance $Ze$ depends upon the position of the tapping of the potentiometer 16, which tapping is connected for alternating voltages to earth. The collector impedance is mainly determined by the resistor 4 and the impedance of the parallel-connected, non-linear network 5, formed by a capacitor 18, resistors 21 and 22, a capacitor 24 and diodes 19 and 20, connected in the reverse direction between the negative terminal $-Vb$ of a source of direct voltage and the junction of the resistors 21 and 22.

The operation of the circuit of FIG. 2 will now be described briefly. An alternating voltage appearing at the base of emitter follower transistor $Tr_1$ is supplied to the base electrode of transistor $Tr_2$ via coupling capacitor 8 with substantially zero phase shift. Transistor amplifier $Tr_2$ amplifies and inverts the phase of the oscillation voltage by approximately 180 degrees at its collector electrode. This alternating voltage is supplied via coupling capacitor 13 to the base electrode of transistor $Tr_3$, which in turn amplifies and inverts the oscillation voltage by approximately another 180 degrees. A portion of the oscillation voltage is regeneratively coupled to the base electrode of transistor $Tr_1$ via measuring capacitor 6, thus sustaining the oscillations. The yarn, not shown, passes between the plates of capacitor 6 so as to vary the capacitance thereof with changes in yarn diameter. The capacitance variations produced, for example, by a slub in the passing yarn, causes a variation in the loop amplification. Therefore, the amplitude of the alternating voltage produced at the collector of transistor $Tr_3$ also varies. The impedance of the non-linear circuit element 5 responds to this change in amplitude so as to vary the amplification of transistor $Tr_3$ to restore the loop amplification factor to unity. The voltage amplitude variations are smoothed in capacitor 24 and produce direct voltage variations at the base of transistor $Tr_4$. Transistor $Tr_4$ supplies a rectified control voltage to a threshold circuit, not shown, which, in a known manner, actuates a cutting mechanism via a relay circuit, which cuts the yarn so that the slub can be removed. By means of a capacitor 3, a negative feedback voltage is coupled from the collector of transistor $Tr_2$ to the base of transistor $Tr_1$, thereby greatly enhancing the overall stability of the system.

The resistors 21 and 22 constitute a potentiometer having a given effective resistance. FIG. 3 shows the equivalent diagram in which the diode 19 is connected via the equivalent resistor 23 (which represents the effective resistance of the parallel connected resistors 21 and 22 as seen from their common junction point of fixed potential.

In accordance with the alternating voltage amplitude at point 25, the value of the load represented by the non-linear element lies between $\infty$ and $\frac{1}{8}R_{23}$. With an alternating voltage input of 0, the diodes $D_1$ and $D_2$ are blocked and the load is $\infty$. With a 100% effective peak-to-peak rectification of a high alternating voltage having an effective value E, $R_{23}$ has produced across it a voltage of a value 2EV2. The power dissipated in $R_{23}$ is in this case $8E^2/R_{23}$, which provides an effective load of $\frac{1}{8}R_{23}$.

It has been found that by a correct choice of voltages and impedances (the working point of the oscillator can be adjusted by means of the potentiometer 16) the effect of the temperature dependence of the voltage across the (conductive) diodes can be completely eliminated.

The input impedance of the transistor $Tr_1$ is reduced by the strong negative feedback to a low stable value; the cycling amplification must be equal to 1 (condition of oscillation), so that it applies approximately that:

$$K\frac{Cm}{Cinp}\cdot\frac{Zc}{Ze}=1$$

from which it follows that $$\frac{Cm}{Cinp}=K\cdot\frac{Ze}{ZcTr_3}$$

wherein $Cm$ designates the capacity of the measuring capacitor, $Cinp$ the input capacity, $Zc$ the collector impedance and $Ze$ the emitterimpedance of transistor $Tr_3$.

Herein $Cinp$ and $Ze$ are constant, so that there is a fixed relationship between the capacity of the measuring capacitor and the collector impedance $Zc_{Tr_3}$, which is mainly formed by the non-linear element and the resistor 4.

The alternating voltage at point 25 affects the impedance of the non-linear element in a sense such (i.e. the generator adjusts itself so) that the said oscillation condition is fulfilled.

The direct voltage across $R_{23}$, i.e. at the junction of the resistors 21 and 22, is intimately dependent upon the value of the load impedance formed by the arrangement. Capacity variations of the measuring capacitor 6 therefore provide, owing to the presence of the smoothing capacitor 24, direct voltage variations at the base of the transistor $Tr_4$.

These voltage variations may be further amplified and when an adjustable threshold value is exceeded they actuate, in known manner, via a relay circuit a cutting mechanism, which cuts the yarn so that the slub can be removed.

It has been found that the arrangement has adequate stability and that capacity variations of the order of 1% of the measuring capacitor can be determined with a tolerance of about 5%. The measuring capacitor may have a minimum value of 1 pf.; with a capacity of the measuring capacitor of 2 pf., the noise level corresponds to capacity variations of 0.001%.

What is claimed is:

1. Apparatus for detecting variations in a filamentary material, comprising an oscillator circuit having an input circuit and an output circuit, a feedback circuit comprising a measuring capacitor coupled to said input circuit and said output circuit thereby to generate an alternating voltage of a given frequency at said output circuit, said measuring capacitor comprising two electrode plates spaced apart and adapted for passage of said filamentary material therebetween, said capacitor undergoing variations in capacitance as determined by variations of said filamentary material thereby to produce variations of the amplification of said oscillator circuit and variations of the amplitude of said alternating voltage, and means for compensating the variations of said amplification comprising an output impedance coupled to said output circuit and comprising a non-linear impedance element having a continuous variation in impedance as determined by the amplitude variations of the alternating voltage applied thereto, said non-linear element providing an amplitude dependent variable load for said oscillator circuit whereby said variations in impedance produce a change in the feedback voltage of said given frequency supplied to said input circuit.

2. Apparatus for detecting variations in a filamentary material, comprising an oscillator circuit having an input circuit and an output circuit, a source of direct current voltage, a feedback circuit comprising a measuring capacitor coupled to said input circuit and said output circuit thereby to generate an alternating voltage at said output circuit, said measuring capacitor comprising two electrode plates spaced apart and adapted for passage of said filamentary material therebetween, said capacitor undergoing variations in capacitance as determined by variations of said filamentary material thereby to produce variations of the amplification of said oscillator circuit and variations of the amplitude of said alternating voltage, and means for compensating the variations of said amplification comprising an output impedance coupled to said output circuit and comprising a non-linear impedance element having impedance variations as determined by the amplitude variations of the alternating voltage applied thereto, said non-linear element comprising first and second diodes connected in series across said direct current voltage source in the reverse polarity direction.

3. Apparatus for detecting variations in the dimensions of a textile filamentary material, comprising an oscillator circuit having amplifying means and an input circuit and an output circuit, a feedback circuit comprising a measuring capacitor interconnecting said input circuit and said output circuit for generating an alternating voltage at said output circuit, said measuring capacitor comprising a pair of spaced apart electrode plates adapted for passage of said filamentary material therebetween, said capacitor underging variations in capacitance as determined by variations in the dimensions of said filamentary material thereby producing amplitude variations in said alternating voltage, a source of direct current voltage, a load circuit for said amplifying means comprising a non-linear element coupled to said output circuit and having impedance variations as determinned by the amplitude variations of the alternating voltage applied thereto, said non-linear element comprising first and second diodes connected in series, a resistance element connected between said direct voltage source and said series connected diodes, said diodes being connected so as to be reverse biased by said direct voltage source.

4. Apparatus for detecting variations in the dimensions of a textile filamentary material, comprising an oscillator circuit having amplifying means and an input circuit and an output circuit, a feedback circuit comprising a measuring capacitor interconnecting said input circuit and said output circuit for generating an alternating voltage at said output circuit, said measuring capacitor comprising a pair of spaced apart electrode plates adapted for passage of said filamentary material therebetween, said capacitor undergoing variations in capacitance as determined by variations in the thickness of said filamentary material thereby causing amplitude variations in said alternating voltage, a source of direct current voltage, said output circuit comprising a non-linear impedance element having impedance variations as determined by the amplitude variations of the alternating voltage applied thereto, said non-linear element comprising first and second diodes connected in series to form a junction and a resistor connected in series between said diodes and said direct voltage source, said diodes being connected so as to be reverse biased by said direct voltage source, and means for coupling said alternating voltage to the junction of said diodes.

5. Apparatus for detecting variations in the dimensions of a textile filamentary material, comprising an oscillator circuit having amplying means and an input circuit and an output circuit, a feedback circuit comprising a measuring capacitor interconnecting said input circuit and output circuit for generating an alternating voltage at said output circuits, said measuring capacitor comprising a pair of spaced apart electrode plates adapted for passage of said filamentary material therebetween, said capacitor undergoing variations in capacitance as determined by variations in the thickness of said filamentary material thereby causing amplitude variations in said alternating voltage, a source of direct current voltage for supplying operating potentials for said amplifying means, said output circuit comprising a non-linear element having impedance variations as determined by the amplitude variations of the alternating voltage applied thereto, said non-linear element comprising first and second diodes connected in series to form a common junction connecting the anode and cathode of said first and second diodes, respectively, a voltage divider network connected across said voltage source, means for connecting the anode of said second diode to said voltage source and the cathode of said first diode to a point on said voltage divider in a manner such that said diodes are reverse biased, and means for capacitively coupling said alternating voltage to the junction of said first and second diodes.

6. Apparatus as described in claim 5 further comprising a second capacitor connected between said point on said voltage divider and said source of direct voltage.

7. Apparatus as described in claim 6 further comprising means for converting said alternating voltage produced at said output circuit into a direct voltage for control purposes, said means for converting including said second capacitor.

8. Apparatus for detecting variations in the thickness of a filamentary material, comprising an oscillator circuit having amplifying means and an input circuit and an output circuit, said oscillator comprising first, second and third transistors connected in cascade, said first transistor being connected as an emitter follower and said second and third transistors being connected in a common emitter configuration, capacitor means connecting the collector electrode at said second transistor to the base electrode of said first transistor for supplying a negative feedback voltage thereto, a positive feedback circuit comprising a measuring capacitor interconnecting said input circuit and output circuit for generating an alternating voltage at said output circuit, said measuring capacitor comprising a pair of spaced apart electrode plates adapted for passage of said filamentary material therebetween, said capacitor undergoing variations in capacitance as determined by the thickness of said material thereby causing amplitude variations in said alternating voltage, a source of direct current voltage for supplying operating potentials for said amplifying means, a non-linear element coupled to said output circuit and having impedance variations as determined by the amplitude variations of said alternating voltage, said non-linear element comprising first and second diodes connected in series to form a common junction between the anode and cathode of said first and second diodes, respectively, a voltage divider network connected across said voltage source, means for connecting the anode of said second diode to said voltage source and the cathode of said first diode to a point on said voltage divider in a manner such that said diodes are reverse biased, and means for capacitively coupling said alternating voltage to the junction of said first and second diodes.

References Cited in the file of this patent

UNITED STATES PATENTS

| | | |
|---|---|---|
| 2,807,720 | Charles | Sept. 24, 1957 |
| 2,919,413 | Charles | Dec. 29, 1959 |
| 3,042,908 | Pearson | July 3, 1962 |
| 3,059,177 | Winchel | Oct. 16, 1962 |